(12) United States Patent
Bunel et al.

(10) Patent No.: US 6,423,253 B1
(45) Date of Patent: Jul. 23, 2002

(54) METHOD AND INSTALLATION FOR MAKING CONTAINERS BY BLOWING THERMOPLASTIC BLANKS

(75) Inventors: Christophe Bunel; Michel Martin, both of Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 09/462,871

(22) PCT Filed: Jul. 16, 1998

(86) PCT No.: PCT/FR98/01553

§ 371 (c)(1),
(2), (4) Date: Jan. 18, 2000

(87) PCT Pub. No.: WO99/04951

PCT Pub. Date: Feb. 4, 1999

(30) Foreign Application Priority Data

Jul. 25, 1997 (FR) .................................... 97 09686

(51) Int. Cl.[7] .............................................. B29B 17/00
(52) U.S. Cl. .............................. 264/37.16; 264/37.25; 264/526; 264/529; 264/531; 264/543; 264/917; 425/522; 425/532; 425/540
(58) Field of Search ............................ 264/37.16, 526, 264/531, 529, 543, 917, 37.25; 425/522, 532, 540

(56) References Cited

U.S. PATENT DOCUMENTS

| 4,394,333 A | * | 7/1983 | Fukushima et al. ........... 264/37 |
| 5,648,026 A | * | 7/1997 | Weiss .......................... 264/37 |
| 5,817,348 A | * | 10/1998 | Ikeda .......................... 425/529 |

* cited by examiner

Primary Examiner—Suzanne E. McDowell
(74) Attorney, Agent, or Firm—Sughrue Mion, PLLC

(57) ABSTRACT

The invention concerns a method whereby in an installation (1, 2, 3) for making containers (200, 300) by blowing blanks (400), for example thermoplastic preforms, the high pressure fluid derived from degassing a container is re-used and injected (14) into a container previously degassed, for example for cooling it or for thoroughly spraying the inside thereof to solidify the material.

15 Claims, 1 Drawing Sheet

METHOD AND INSTALLATION FOR MAKING CONTAINERS BY BLOWING THERMOPLASTIC BLANKS

The invention concerns improvements made at the time of manufacturing of containers of thermoplastic material such as bottles, bowls or any other type of containers by blow molding in the finishing molds, of blanks having previously been extruded or injection molded or even consisting of intermediate containers obtained at the time of a prior blow molding step.

Various procedures and systems for manufacturing containers by blow molding blanks of thermoplastic material are known.

In the systems called extrusion-blow molding, the blanks called preforms, are obtained by extrusion of the material. For this purpose, an extrusion device is connected to the system, which makes it possible to obtain a tube either sequentially or continuously. This tube is extruded and brought by gravity or by guiding to the interior of the finishing molds.

Then a determined length of the tube is held in the finishing molds; next a gas under pressure, generally air, is blown into the part that is held, making is possible to expand it and to give it the shape of the cavities of the mold and resulting in the desired containers.

In the systems called injection-blow molding, the blanks, called preforms, are obtained by injection of the material into a connected device on, or separate from, the system. The preforms are in the shape of tubes open at one end and closed at the other. The preforms are introduced into the finishing mold cavities as soon as they are at a temperature that is adequate for blow molding them. Thus, when the preforms are injected in a device that is separate from the blow molding system, the latter has a reheating furnace for the preforms to soften them and permit blow molding of the containers.

In addition, there are systems using successive blow molding steps: an intermediate container is formed in a first mold starting with a blank, then it is blow molded again in a second mold. Thus, the intermediate container is a blank with respect to the final container.

Among the known systems, no matter whether it concerns extrusion-blow molding systems or injection-blow molding systems, there are those that have at least two molds which are moved by a rotating movement in the system in such a manner as to deliver the blanks successively into the molds in a loading zone, to an intermediate zone in which, among other things, the blow molding of the containers takes place and the completed containers are brought into an ejection zone.

Systems such as this can have high production rates since when a mold is being filled, another may be in the process of blow molding and another may be in the process of ejection.

In addition, the system needs only one device for loading and one device for ejection. Also systems such as this make it possible for the manufacturing process to be reproducible and avoid production scatter.

Naturally, it is understood that the higher the number of molds, the more the rates may be elevated.

Thus, by way of example, in the line of machines produced by the applicant, there are injection-blow molding machines and extrusion-blow molding machines in which the molds are carried by a carousel that is moved by a continuous rotation movement. The presence of this carousel makes rapid rotation possible; in addition, this rotating machine technology makes it possible to ensure excellent synchronizing of the operations among the various elements of each machine set up in this way.

In the sense of the present invention, mold must be understood as a subassembly component having one or several cavities. The cavity or cavities have the external shape of the container to be manufactured. The French patent request published under the number 2 709 264, in the name of the applicant, describes an injection-blow molding machine in which each mold has at least two cavities (or imprints of the containers).

Blank is intended to mean preform or intermediate container, i.e., most generally any element that is able to be transformed into a container (itself being intermediate or final) by blow molding.

In a known manner, the manufacturing of a container as well as the loading of the blank and the ejection of the completed container requires at least one blow molding with gas, generally air, at elevated pressure and gas removal before ejection.

In certain improved implementations, a supplementary flow of gas under pressure is injected after partial or total gas removal before the intermediate or final container can be removed from its blow molding mold. The injection of gas is generally carried out at a pressure that is lower than the blow molding pressure. This supplementary injection is carried out particularly in procedures that use blow molding by thermofixation, i.e., the procedures in which the containers are blow molded in very hot molds. It has been confirmed that, in a surprising manner, this supplementary injection makes it possible to obtain containers that have mechanical resistance or other elevated properties when they are used.

Generally, the supplementary injection consists of a sweeping rather than a reblowing, i.e., of a circulation of gas in the container. For this reason, during the sweeping, the container is open at least partially to the outside air in order to permit this circulation.

One disadvantage of the known systems is that they are very high consumers of blow molding gas, a problem that is further increased when supplementary injection is used. Thus, for example, in the injection-blow molding systems produced by the applicant, the blow molding air is applied at a pressure of 40 bars. This indicates that the blow molding of a one-liter container requires forty liters of air, that of a two-liter container requires eighty liters, etc.

The supplementary injection carried out between 10 and 20 bars thus requires between 10 and 20 liters of air for a one-liter container, 20 to 40 liters for a 2-liter container. Still it is necessary to mention that the applicant's machines have a rate between approximately 1,200 and 50,000 containers per hour, which corresponds to a theoretical consumption of air under pressure between 66,000 and 2,750,000 liters of air per hour to manufacture one-liter containers with a supplementary injection at 15 bars.

The goal of the invention is a procedure in which the consumption of compressed gas is reduced.

According to the invention, a procedure for manufacturing containers by blow molding using gas at a first pressure ($P1$), in particular air, of blanks on the interior of molds in a system containing at least two molds in which the blanks are successively introduced and the containers are successively blow molded, the forming of each container comprising, after a blow molding step, a step for at least partial degassing following a step in the course of which gas at a second pressure ($P2$) is introduced into the container and is characterized in that the gas at the second pressure ($P2$) is made up of at least part of the product of degassing of at least one container that is blow molded further on in the system.

Thus, the consumption of gas under pressure is considerably reduced. In addition, given that the supplementary injection of gas is carried out by transfer, it is not necessary to provide means for producing supplementary gas under pressure: it is sufficient simply to provide the adapted interconnections between the different molds. Because of this, the system is simplified and its cost is considerably reduced.

In contrast, and this is fundamental, the performance of the system is not reduced in any way. In fact, as indicated above by way of example, in the applicant's machines, the supplementary injection is carried out with gas at a pressure between 10 and 20 bars and initial blow molding is carried out at 40 bars. Assuming that the supplementary injection consists of reblowing at a lower pressure, it is possible, starting with a container that is blow molded at 40 bars, to degasses it into another of the same volume which has already been degassed in order to obtain a residual pressure of 20 bars in each of the containers (application of Mariotte's Law).

If, as is usually the case, the supplementary injection consists of a sweeping of the container, i.e., a circulation of gas in the container permitting the gas to escape into the outside air during this operation, then the sweeping pressure can be decreased from 40 bars to zero during the sweeping if the following container is completely degassed in order to carry out the sweeping of the preceding one.

According to another characteristic, the supplementary injection carried out in a container is carried out using the blow molded container in the mold that follows immediately in the system.

Thus, the pneumatic connections are easy to implement.

In one embodiment, when the system has at least three molds, the supplementary injection is carried out by causing an introduction in cascade of one part of the product of degassing of several containers into another.

This creates a turbulent movement which again improves the efficiency of the sweeping.

According to another characteristic, in one embodiment, each mold has at least two blow molding cavities, the product of degassing of one container manufactured in one cavity of a mold is transferred into a corresponding cavity of a preceding mold.

This makes it possible to facilitate the system of pneumatic connections while avoiding crossing of the tubes.

Other characteristics and advantages of the invention will be apparent upon reading the description which follows under consideration of the attached Figures in which.

Figure 1:
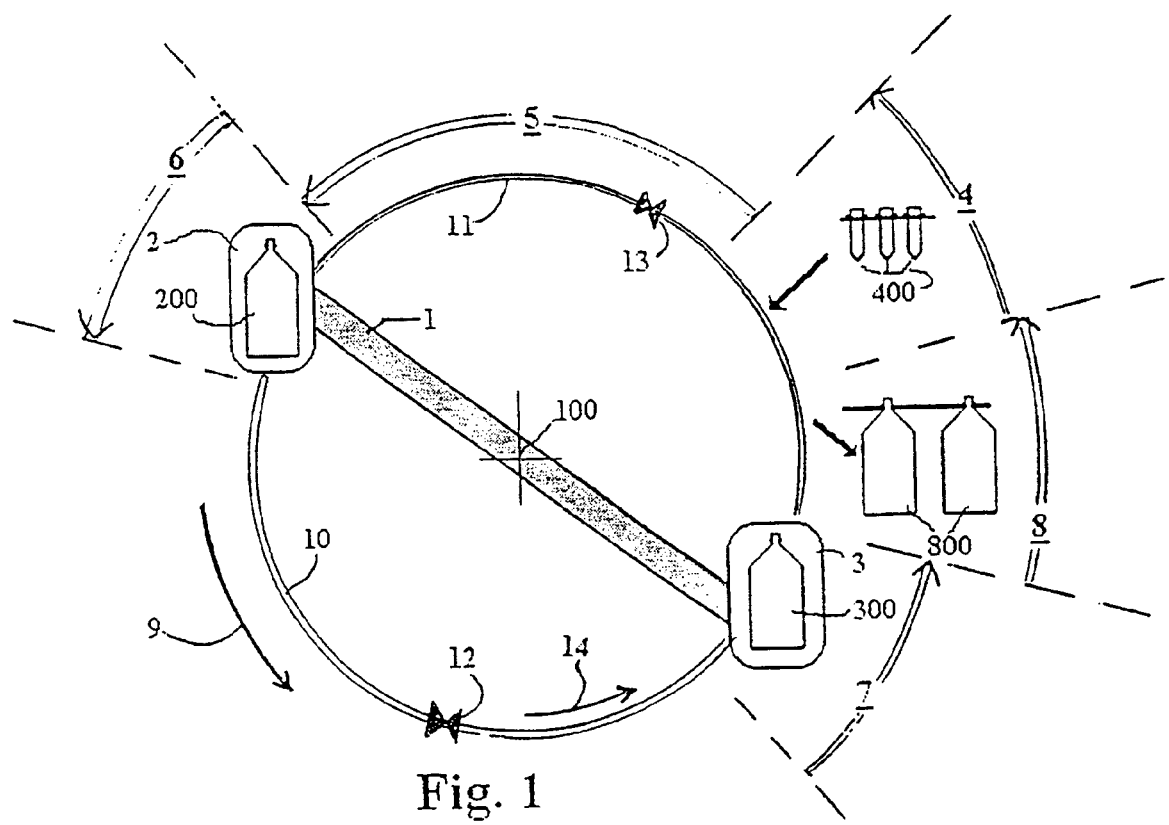
FIG. 1 illustrates the schematic diagram of a possible application in a system for use of the procedure according to the invention with two molds.

In the example in FIG. 1, the system is called injection-blow molding and comprises a structure 1 having two molds 2, 3 on a path, along which it passes, respectively, at least through one zone 4 for loading the blanks 400, in this case the preforms, a blow molding zone 6 (or drawing-blow molding), a zone 6 for degassing, a zone 7 for injection of gas at the second pressure, and a zone 8 for discharging the finished containers (800).

In the example shown, the structure 1 for carrying the molds is, in a known manner, a mold-bearing carousel turning around axis 100 of rotation. Here the molds are diametrically opposed with respect to the axis of rotation. In a general manner, they are uniformly distributed around this axis. The direction of rotational movement of the carousel is shown by arrow 9.

Fluid connections 10, 11 are arranged between the molds 2, 3 in such a way that when one of the molds 2 is located in the degassing zone 6, the gas, generally air of the container blow molded in this mold, which is discharged simply because of its current pressure, is directed into the container previously manufactured in the other mold 3. In addition, it is understood that the connections 10, 11 are arranged so that, at the time of the step for blow molding per se, when one mold is in the zone 5 for blow molding, the blow molding gas does not escape except toward the container that was previously blow molded which then is located between the degassing zone 6 and the injection zone 7 of the gas at the second pressure. For this reason, the system has valves 12, 13 with electric or pneumatic or mechanical or other control which are arranged in the fluid circulation circuits in such a way as to carry out the transfer of gas at the proper times.

Thus, in the example in FIG. 1, a first connection 10 is used for transfer of the gas from the degassing contained in the container 200 blow molded in the mold 2 toward the container 300 contained in the mold 3. A first valve 12 is connected with this communication circuit and is controlled by means, not shown, in such a way that the circuit 10 would be open only when the mold 2 is in the zone 6 for degassing. A second connection 11 is used for transfer of the product of degassing from container 300 in mold 3 to container 200 in mold 2 and a valve 13 is connected with this circuit. This valve 13 is controlled in such a way that the circuit 11 would be open when the mold 3 is in the zone 6 for degassing. More specifically, in FIG. 1, the mold 2 is then shown when it is located in zone 6 for degassing. The valve 12 is thus open to allow the gas in container 200 manufactured in this mold to pass continuously and transfer it to container 300 enclosed in mold 3 which is located in zone 7 for injection of the gas at a second pressure. This transfer is illustrated by arrow 14 in the Figure.

The opening and closing of valves 12, 13 may be controlled using sensors for the positions of molds 2, 3 respectively with regard to the zones of the system. It is not until a mold is in zone 6 for degassing that the connection to the other mold is authorized. Numerous types of sensors can be used (electrical, electronic, electromagnetic, mechanical or other).

In one particularly advantageous application, the control of valves 12, 13 is carried out by known control elements for degassing which are present elsewhere, including in systems that do not make use of the invention.

In addition, when the injection at the second pressure ensures a sweeping of the inside of the container, means are provided to permit circulation of gas between the inside of the container and the outside air.

In the case of an injection-blow molding system, the circulation from the interior to the exterior can be carried out in a known manner by lifting the blow molding tube during the sweeping in such a way as to disengage the opening (the neck) of the container on which this tube is supported in a sealed manner during the blow molding.

In one variation, it is provided that the tube is not lifted but is connected to a connection circuit, making it possible for the gas to escape to the outside during the sweeping.

In the case of a manufacturing system using extrusion-blow molding, it is possible to modify the existing fluid circuits to make possible the transfer of the air from degassing continuously in one container toward another container of another mold and, possibly, a sweeping by allowing an escape.

Figure 2:
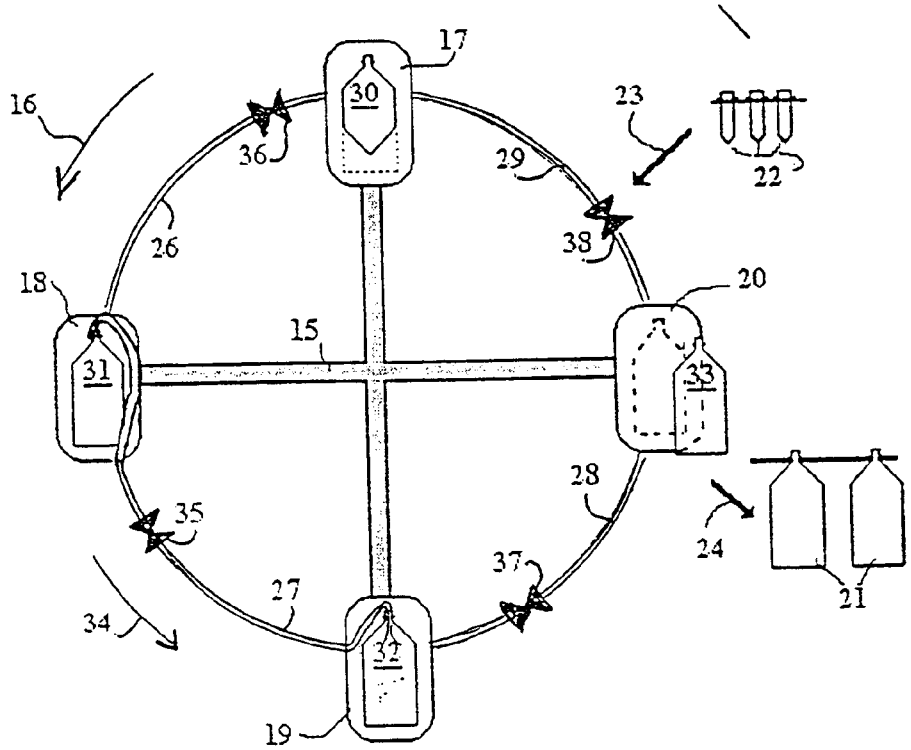
FIG. 2 illustrates the principle of the invention on a system having more than two molds.

FIG. 2 shows how the invention can be applied to a system having more than two molds.

A carousel 15, arrow 16, carries four blow molding molds, 17, 18, 19, 20, to obtain containers 21 from preforms 22. After reheating, the preforms are loaded successively into the molds in a loading zone 23 and the containers are removed in an unloading zone 24.

The tubes 26, 27, 28, 29 are arranged between the molds: 26 connects molds 17 and 18, 27 connects molds 18 and 19, 28 connects molds 19 and 20, and 29 finally connects molds 20 and 17 so that when a container is in the process of degassing, its contents will be transferred, at least in part, into the preceding container which itself has been degassed, making possible, for example, a sweeping of this preceding container.

In the example, a container 30 is in the process of blow molding in a mold 17; a container 31 is finished in the mold 18, and the gas that it contains is in the process of transfer to the container 32 blow molded in mold 19. Previously, the contents of container 32 had been transferred to the container 33, formed in mold 20, and arrived at zone 24 for discharging.

Thus, in FIG. 2, a transfer takes place between container 31 and container 32. This is symbolized by arrow 34 near tube 27.

The transfer of gas from one container to another is authorized or prohibited by valves 35, 36, 37, 38 which are opened or closed at the appropriate times.

Thus, in the example, the valve 35 on the tube 27 is open and the valves 36, 37, 38 to the tubes 26, 28, 29 are closed.

The opening or closing is controlled either mechanically (cams, roller, etc.) or electrically.

In an advantageous embodiment, the control of the valves is carried out using the control elements for degassing present in this type of system and not shown here. Valve 35 is controlled with the control element for degassing of mold 18; the valves 36, 37, 38 are controlled respectively by the control elements for degassing of molds 17, 19, 20.

In one embodiment, the procedure comprises a phase of drawing and blow molding of the blank or of the container in the process of blow molding using drawing means such as a drawing rod and the introduction of gas at the second pressure is carried out with these means, which are then provided with ducts and orifices for gas circulation.

In this case, the drawing means may be connected since it would mainly be the base of the container that would receive the flow of gas.

Naturally, the invention is not limited to the embodiments described. On the contrary, it includes all of the variations.

What is claimed is:

1. Manufacturing procedure for containers (200, 300, 800) by blow molding using gas under pressure, in particular air, of blanks (22, 400) of thermoplastic material on the inside of molds (2, 3, 17, . . . 20) in a system containing at least two finishing molds in which the blanks are successively introduced and the containers are successively blow molded, the blow molding of each container comprising, after a step (5) of blow molding using a gas at a first pressure (P1), a step (6) of at least partial degassing, followed by a step (7) in the process of which gas at a second pressure (P2), lower than the first (P1), is introduced into the container, characterized in that the gas at the second pressure (P2) introduced into a container is made up at least in part of the product of degassing of at least one container that has been blow molded further on in the system.

2. Procedure according to claim 1, characterized in that the gas at the second pressure (P2) introduced into a container formed in a mold is the product of the degassing step of a container formed in the mold that immediately follows in the system.

3. Procedure according to claim 2, characterized in that the step for introduction of gas at the second pressure consists of sweeping the interior of the container, i.e., allowing the gas to circulate freely in the container, an escape to the outside air is carried out from the interior toward the exterior of the container during the sweeping.

4. Procedure according to claim 3, characterized in that it comprises a phase of drawing the blank or the container in the process of blow molding using means for drawing such as a drawing rod and the introduction of the gas at the second pressure (P2) is carried out using means that are provided with ducts and orifices for circulation of the gas.

5. Procedure according to claim 4, characterized in that the drawing means are arranged so that it is mainly the base of the container that would receive the flow of gas.

6. Procedure according to claim 1, characterized in that the system contains at least three finishing molds, a cascade carries out introduction of the product of degassing of one container manufactured in a given mold into at least two containers blow molded in at least two molds preceding the said mold in the system.

7. Procedure according to claim 6, characterized in that the step for introduction of gas at the second pressure has as its function sweeping the interior of the containers in cascade, i.e., allowing the gas to circulate freely in the containers; an escape to the outside air being implemented from the interior toward the exterior of the container in cascade that is the one farthest from the one where the degassing started.

8. Procedure according to claim 1, characterized in that each mold contains at least two blow molding cavities, thus permitting blow molding of at least two containers, the product of degassing of one container manufactured in one cavity of a mold is transferred into at least one container manufactured in a corresponding cavity of a preceding mold.

9. Procedure according to claim 1, characterized in that the corresponding cavities of the two successive molds are isolated since it is not necessary to transfer the product of degassing from one to the other.

10. Manufacturing system for containers that uses the procedure according to claim 1, characterized in that it comprises at least two blow molding molds and fluid connections (10, 11) mounted between the molds and arranged so that when one container blow molded in a mold is in the process of degassing, at least one part of the gas that it contains is directed toward a container that was previously manufactured in another mold, and in addition arranged so that when a container is in the process of blow molding, the blow molding gas does not escape except toward a container that was previously blow molded.

11. System according to claim 10, characterized in that it comprises at least one carousel (1, 15) on which at least two molds (2, 3, 17, 18, 19, 20) are mounted for blow molding the containers, the carousel being moved with a continuous rotational movement (9, 16) at the time of manufacturing the containers; in that it comprises additionally a zone (4, 23) in which the blanks are introduced into the molds, a zone (5) for blow molding the container at a first pressure (P1), a zone (6) for degassing of the containers, a zone (7) for introduction of at least a part of the product of degassing of a container manufactured in one mold into the inside of a container manufactured in another mold and a zone (8, 24) for ejection of the containers (21).

12. System according to claim 10, characterized in that the blanks are extruded preforms and the system comprises a device for extrusion of the said preforms.

13. System according to claim 10, characterized in that the blanks are preforms obtained by injection molding, and the system comprises a device for introduction of the preforms into the molds.

14. System according to claim 10, characterized in that the blanks are intermediate containers obtained by blow molding the previously injection molded preforms.

15. System according to claim 10, characterized in that the blanks are the intermediate containers obtained by blow molding of previously extruded preforms.

* * * * *